(12) United States Patent
Jackson et al.

(10) Patent No.: US 8,397,552 B2
(45) Date of Patent: Mar. 19, 2013

(54) LARGE LEAK DIAGNOSTIC TOOL FOR A SEALED FUEL SYSTEM IN A VEHICLE

(75) Inventors: Robert Jackson, Brighton, MI (US); William R. Cadman, Fenton, MI (US); John F. Van Gilder, Webberville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 285 days.

(21) Appl. No.: 12/895,907

(22) Filed: Oct. 1, 2010

(65) Prior Publication Data

US 2012/0079873 A1 Apr. 5, 2012

(51) Int. Cl.
*G01M 3/34* (2006.01)
*G01M 3/04* (2006.01)

(52) U.S. Cl. ............ 73/49.3; 73/40; 73/49.2; 73/49.7

(58) Field of Classification Search ............ 73/40, 49.2, 73/49.3, 49.7
See application file for complete search history.

(56) References Cited

U.S. PATENT DOCUMENTS

| 7,213,450 | B2 * | 5/2007 | Matsubara et al. | 73/114.39 |
| 7,681,561 | B2 * | 3/2010 | Hilditch | 123/575 |
| 2006/0254342 | A1 * | 11/2006 | Ito et al. | 73/49.2 |
| 2009/0171523 | A1 * | 7/2009 | Luo et al. | 701/22 |
| 2009/0194194 | A1 * | 8/2009 | Wilkinson | 141/94 |
| 2009/0266147 | A1 * | 10/2009 | Maegawa | 73/40.7 |

* cited by examiner

*Primary Examiner* — Hezron E Williams
*Assistant Examiner* — David Z Huang
(74) *Attorney, Agent, or Firm* — Quinn Law Group, PLLC

(57) ABSTRACT

A vehicle includes a sealed fuel system and a controller. The fuel system includes a fuel tank, a fuel cap, a control orifice, and an absolute pressure sensor. The controller associates a threshold large leak in the fuel system with a fuel cap sealing error. The controller detects completion of a prior refueling event, compares measurements from the pressure sensor to a reference vacuum across the control orifice to determine the presence of the threshold large leak, and sets a diagnostic code corresponding to the large leak only upon completion of the prior refueling event. A method for detecting the large leak includes detecting completion of the refueling event, comparing vacuum measurements from the absolute pressure sensor to a reference vacuum across the orifice to determine the presence of the large leak, and setting a diagnostic code corresponding to the large leak only upon completion of the prior refueling event.

15 Claims, 2 Drawing Sheets

LARGE LEAK DIAGNOSTIC TOOL FOR A SEALED FUEL SYSTEM IN A VEHICLE

TECHNICAL FIELD

The present invention relates to a diagnostic tool for detecting or diagnosing a threshold leak in a sealed fuel system aboard a vehicle, and for associating such a leak with an improperly sealed fuel cap.

BACKGROUND

Vehicle fuel systems store and supply fuel used by an internal combustion engine. A typical vehicle fuel system includes a fuel tank, a pump operable for drawing fuel from the tank, and fuel lines interconnecting the various fuel handling components. A filter may also be included within the fuel system to remove any suspended particulate matter and other entrained contaminants prior to combustion of the fuel within the engine's cylinder chambers. A fuel regulator maintains sufficient pressure in the fuel lines, and also cycles excess fuel to the fuel tank.

In order to prevent fuel vapor from escaping into the surrounding atmosphere, vehicles may include equipment that isolates and stores vapor from the fuel tank, and that ultimately purges the stored vapor to the engine intakes. Certain vehicles, such as extended-range electric vehicles (EREV) or plug-in hybrid electric vehicles (PHEV), use sealed fuel systems to minimize the atmospheric discharge of hydrocarbon vapors, thus helping to minimize the vehicle's environmental impact. Sealing integrity is essential to the proper function of a sealed fuel system.

SUMMARY

Accordingly, a vehicle is disclosed herein which includes a sealed fuel system and a controller. The sealed fuel system includes a fuel cap, a control orifice, and an absolute pressure sensor which is calibrated to a diameter of the control orifice. A diurnal control valve, a fuel tank pressure sensor, a vacuum pump, and switching valve are also typically included in the sealed fuel system to provide proper diagnostic testing and system functionality. The controller automatically associates a threshold leak in the sealed fuel system with a sealing error of the fuel cap, and is operable for detecting a completion of a prior refueling event of the vehicle. The controller compares vacuum measurements from the absolute pressure sensor to a reference vacuum that is measured across the control orifice to determine the presence of the threshold leak. The controller then sets a diagnostic code corresponding to the threshold leak only when also detecting a prior refueling event.

A method for detecting a threshold leak in the sealed fuel system noted above includes detecting completion of a prior refueling event of the vehicle, and then comparing vacuum measurements from the absolute pressure sensor to a reference vacuum across the control orifice to determine the presence of the threshold leak. The method further includes setting a diagnostic code corresponding to the threshold leak only when also detecting completion of a prior refueling event, and thereby automatically associating the threshold leak with a sealing error of the fuel cap.

The above features and advantages and other features and advantages of the present invention are readily apparent from the following detailed description of the best modes for carrying out the invention when taken in connection with the accompanying drawings.

DETAILED DESCRIPTION

Figure 1:
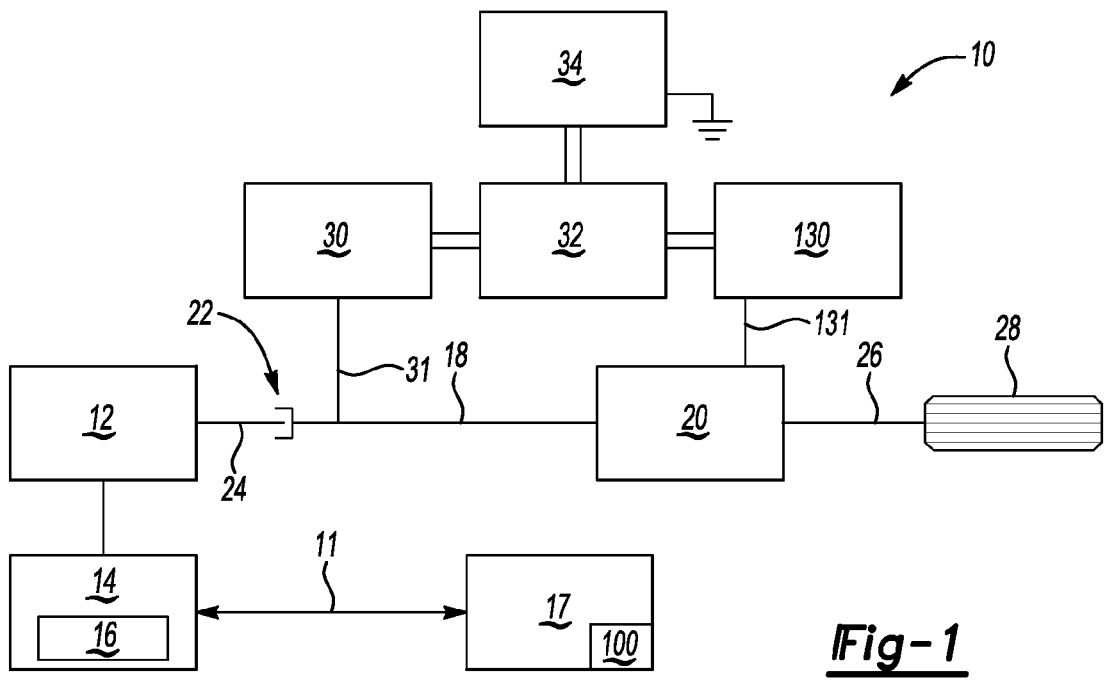
FIG. 1 is a schematic illustration of a vehicle having a sealed fuel system and a controller operable for diagnosing a threshold leak in the sealed fuel system.

Referring to the drawings, wherein like reference numbers correspond to like or similar components throughout the several figures, and beginning with FIG. 1, a vehicle 10 has a sealed fuel system 14. The fuel system 14 is in communication with a controller 17 via a set of control signals 11. As used herein, the term "sealed fuel system" refers to a vehicle fuel system that is configured to prevent a leakage of fuel vapor to the surrounding atmosphere at all times other than during a refueling event. During a refueling event, the insertion of a gas nozzle temporarily breaks the seal. The remainder of the time, atmospheric venting of fuel vapor is largely prevented. The fuel system 14 is therefore closely monitored for leaks using the controller 17, and in particular using a large leak diagnostic algorithm 100 as described below with reference to FIG. 3.

Sealed fuel system 14 includes an Evaporative Leak Check Pump (ELCP) circuit 16 having various fluid control components, which are described in detail below with reference to FIG. 2. Certain elements of the ELCP circuit 16 are used in conjunction with an execution of the algorithm 100 by the controller 17 in order to provide a diagnostic tool that is suitable for diagnosing or detecting a threshold leak within the fuel system 14.

That is, the algorithm 100 diagnoses a threshold large leak level and associates the leak with a fuel cap sealing error. Conventional ELCP leak diagnostic tools cannot adequately distinguish between a threshold small leak and a threshold large leak. As explained below, in some emerging vehicle designs a vacuum pump is used to generate a reference vacuum across a control orifice. The resultant vacuum is then measured at different parts of the system, and can be associated with an equivalent leak orifice size.

For example, a threshold small leak may correspond to an orifice of approximately 0.030", and a threshold large leak may correspond to an orifice of greater than approximately 0.090". As the vacuum level for a 0.030" threshold small leak is typically approximately 7% to 12% of the reference vacuum, and as the vacuum level for a 0.090" threshold large leak is similar at approximately 0% to 4% of the reference vacuum, the difference between the two vacuum levels is not easily discernable. A diagnostic tool may inadequately distinguish between the two sizes in a sealed fuel system. Also note that the larger the equivalent orifice, the lower the vacuum that can be built by a vacuum pump. For instance, a 0.020" leak size may allow 2.0 kPa of vacuum to be built by a vacuum pump, while a 0.030" leak size may allow only 0.2 kPa of vacuum to be built by the same pump. Thus, smaller equivalent leak orifices correspond to higher vacuum levels, thus a threshold large leak corresponds to a vacuum level that is lower than a corresponding vacuum threshold. The controller 17 and algorithm 100 are therefore configured to diagnose a large leak in the manner set forth below.

Still referring to FIG. 1, the vehicle 10 includes an internal combustion engine 12 that is selectively connectable to an input member 18 of a transmission 20 via an input clutch 22.

The input clutch 22 may include a spring and damper mechanism (not shown) to help smooth the connection between a crankshaft 24 of the engine 12 and input member 18. Although not shown in FIG. 1 for simplicity, the transmission 20 may include as many gear sets, clutches, and interconnecting members as are required to provide the desired range of output speeds. Torque from the engine 12 is ultimately transmitted through transmission 20 to an output member 26, and ultimately to a set of drive wheels 28.

Vehicle 10 may also include a respective first and a second traction motor 30, 130 each capable of selectively delivering motor torque to the drive wheels 28, either in conjunction with or independently of the transfer of engine torque depending on the design of the vehicle. Each motor 30, 130 may be configured as a multi-phase permanent magnet/AC induction-type electric machine, and individually rated for approximately 60VAC to approximately 300VAC or more depending on the vehicle design. Motor torque from either or both of the traction motors 30 and 130 is transmitted to their respective motor output shafts 31 and 131, each of which is connected to various members of the transmission 20.

Traction motors 30, 130 can generate electrical energy for onboard storage within an energy storage system (ESS) 34, e.g., a rechargeable high-voltage direct current battery. The ESS 34 may be recharged using an off-board power supply (not shown) when used aboard PHEV, or directly by the motors 30, 130 through a traction power inverter module (TPIM) 32, i.e., a device capable of inverting the power from DC to AC and vice versa as needed, for example during a regenerative braking event or other regenerative event. The vehicle 10 of FIG. 1 may be alternatively configured as an EREV as noted above, wherein the ESS 34 electrically powers the vehicle in an electric-only (EV) operating mode, using engine 12 only as needed to charge the ESS or directly power the motors 30, 130 to extend the effective EV range.

The controller 17 may include one or more digital computers each having a microprocessor or central processing unit, read only memory (ROM), random access memory (RAM), electrically-erasable programmable read only memory (EEPROM), a high-speed clock, analog-to-digital (A/D) and/or digital-to-analog (D/A) circuitry, and input/output circuitry and devices (I/O), as well as appropriate signal conditioning and buffer circuitry. Any algorithms resident in the controller 17 or accessible thereby, including algorithm 100, can be automatically executed by the controller to provide the required functionality.

Figure 2:
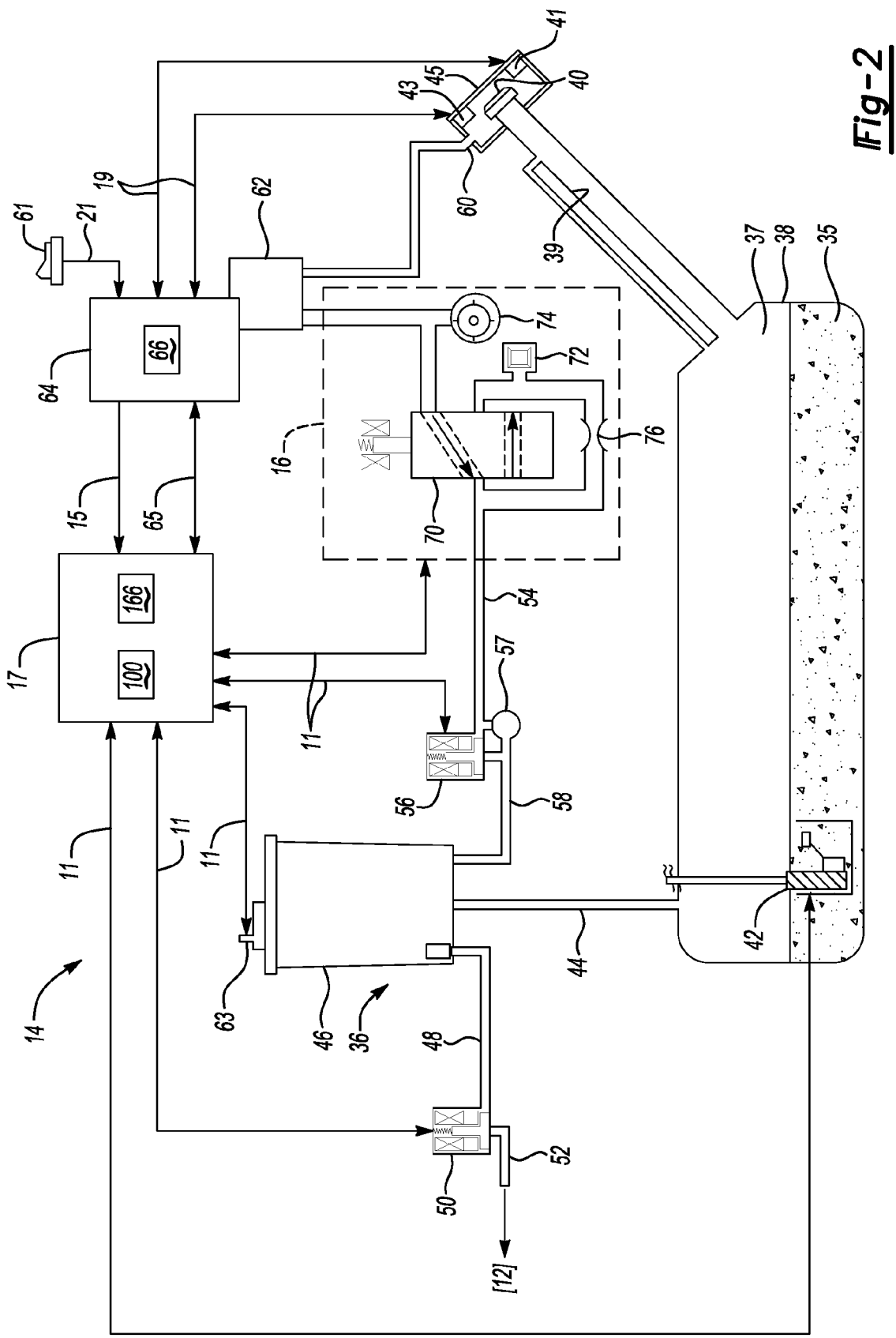
FIG. 2 is a schematic illustration of a sealed fuel system usable with the vehicle shown in FIG. 1.

Referring to FIG. 2, the sealed fuel system 14 mentioned above includes an evaporative emission control (EVAP) system 36, a fuel tank 38, a fuel inlet 39, a fuel cap 40, and a modular reservoir assembly (MRA) 42. The EVAP system 36 includes a first passage 44, an EVAP canister 46, a second passage 48, a purge valve 50, and a third passage 52. Third passage 52 feeds the intakes of engine 12 shown in FIG. 1. First passage 44 connects the fuel tank 38 to EVAP canister 46, and the second passage 48 connects the EVAP canister to the purge valve 50. EVAP system 36 further includes a fourth passage 54, a control valve 56, a relief valve 57, and a fifth passage 58 connecting the control valve to the EVAP canister 46.

In one embodiment, the control valve 56 may be configured as a solenoid-actuated diurnal control valve suitable for controlling a flow of fresh air when purging the EVAP canister 46, or fuel vapor when refueling the EVAP canister, and may be normally closed to further minimize vapor emissions. The control valve 56 can be selectively opened to allow fuel vapor residing within EVAP canister 46 to be purged to the engine 12 of FIG. 1 at certain predetermined times when the engine is running.

The fuel tank 38 contains a mix of liquid fuel 35 and fuel vapor 37. The fuel inlet 39 extends from the fuel tank 38 up to fuel cap 40, thus enabling filling of the fuel tank during a refilling event. The fuel cap 40 closes and seals the fuel inlet 39, and may include a fresh air opening 60 in fluid communication with a filter 62, e.g., a mesh, screen, sintered element, or other suitable filter media. A fuel door position sensor 41 can be used to determine a position of a fuel door 45, and a lock solenoid 43 can be used to further optimize sealing functionality.

A vehicle integration control module (VICM) 64 having a timer or clock 66 communicates with the lock solenoid 43 and with the position sensor 41, as indicated in FIG. 2 by arrows 19. In some vehicle designs, such as certain EREVs, an optional refuel request button or switch 61 may be used. Switch 61 is in communication with the VICM 64, with an operator actuating the switch to generate signals 21 signaling for a relief of excess pressure or vacuum prior to unlocking of the fuel cap 40 during refueling.

Still referring to FIG. 2, the MRA 42 is positioned within the fuel tank 38, and is adapted for pumping some of the liquid fuel 35 to the engine 12 shown in FIG. 1. Fuel vapor 37 flows through the first passage 44 into the EVAP canister 46, which temporarily stores the fuel vapor. The second passage 48 connects EVAP canister 46 to the purge valve 50, which is initially closed. The controller 17 controls the purge valve 50 to selectively enable fuel vapor 37 to flow through the third passage 52 into the intake system (not shown) of engine 12 of FIG. 1, where it is ultimately combusted. Vapor also flows from ELCP circuit 16, through the fourth passage 54, and to the control valve 56, with the control valve being initially closed. Controller 17 communicates with the control valve 56 and ELCP circuit 16 via the signals 11, and ultimately controls operation of the control valve to selectively enable fuel vapor to flow through fifth passage 58 into the EVAP canister 46 as noted above.

The controller 17 controls and is in communication with the MRA 42, the purge valve 50, and the control valve 56. The controller 17 is also in communication with a fuel tank (FT) pressure sensor 63, which in turn is adapted for measuring gauge pressure in the fuel tank 38, i.e., a positive pressure or a vacuum. In an EREV and other partial zero-emissions vehicles (PZEV), the FT pressure sensor 63 may be positioned on/within EVAP canister 46 as shown in FIG. 2, although other designs may place the FT pressure sensor within the fuel tank 38.

Regardless of where it is placed, the FT pressure sensor 63 is in communication with the controller 17, which in turn is in communication with VICM 64 over a serial bus 65. Clock 66 generates time signals 15 and transmits the same to the VICM 64 based on certain vehicle operating conditions, e.g., an accelerator pedal position and/or length of an engine run cycle. The time signals 15 may be used as an input to controller 17 for determining when to execute algorithm 100, as explained below with reference to FIG. 3.

The ELCP circuit 16 includes various fluid control hardware components for executing a vacuum-based leak test of the sealed fuel system 14. The components include a switching valve 70, which is shown in one particular embodiment as a solenoid controlled device. ELCP circuit 16 further includes an absolute pressure sensor 72 adapted for determining whether the sealed fuel system 14 has a threshold leak, a pump 74 for creating a reference vacuum in the sealed fuel system, including within just the vapor circuit or in the entire sealed fuel system as set forth herein, and a control orifice 76. The absolute pressure sensor 72 may be calibrated to the size of the control orifice, which in one embodiment is approximately 0.150" to 0.170" in diameter.

As will now be explained with reference to FIG. 3, the algorithm 100 set forth herein permits a diagnostic code corresponding to a threshold large leak in the sealed fuel system 14 to be set only after completion of a prior refueling event is detected. The controller 17 uses a threshold maximum leak size as the ELCP large leak detection lower limit (an ELCP measured vacuum level less than a calibratable percentage of reference vacuum), e.g., approximately 0.030" or more according to one embodiment. Additionally, algorithm 100 associates a large leak with an improperly secured fuel cap 40, and then executes a suitable control action in response to diagnosing such a leak. As understood in the art, an improperly secured fuel cap is a condition which certain government regulations allow to be extinguished after one diagnostic pass.

Figure 3:
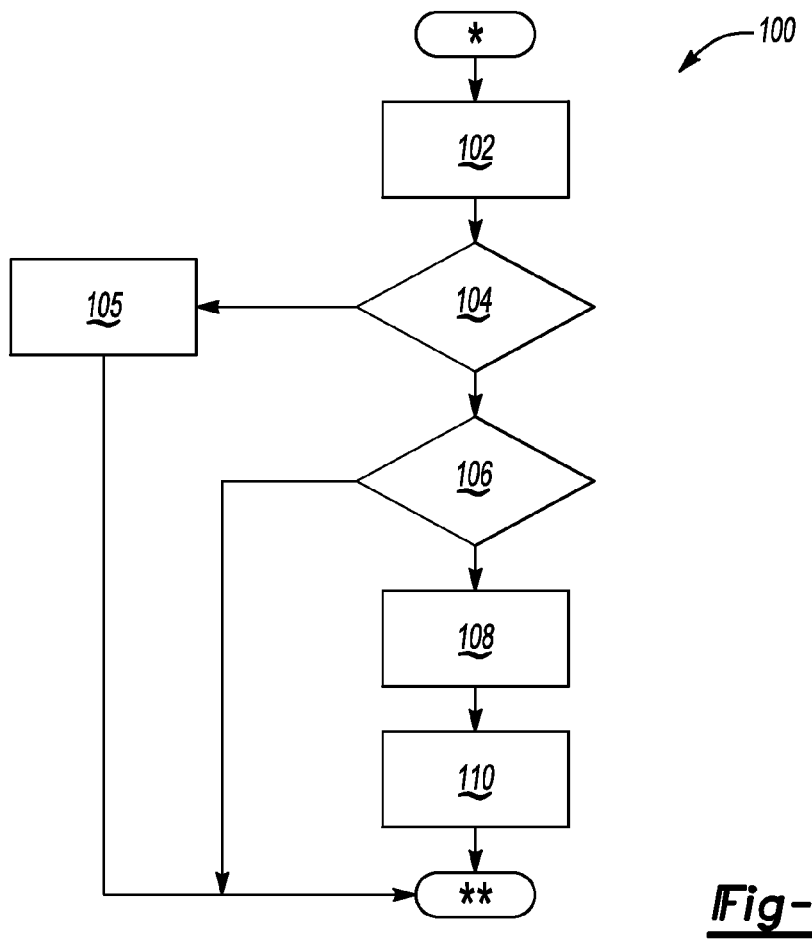
FIG. 3 is a flowchart describing a possible embodiment of the present diagnostic algorithm.

Referring to FIG. 3, algorithm 100 is explained with reference to the structure of the sealed fuel system 14 shown in FIG. 2 and described above. After initiating, which is indicated by a single asterix (*), the controller 17 executes a leak detection sequence within the ELCP circuit 16 at step 102. The pump 74 is first energized to create a reference vacuum across the control orifice 76, and afterwards, the vacuum created by the pump 74 in fuel system 14 is measured and compared to calibrated data to determine the corresponding leak size as set forth above.

When the pump 74 is turned on, the switching valve 70 is set to a "pump" position, and the control valve 56 is opened. Vacuum is drawn by the pump 74 in tank 38 and in the EVAP canister 46. The absolute pressure sensor 72 is then used to measure the gauge pressure, and to relay the gauge pressure to the controller 17. As long as a timed duration set by a clock 166 or other timing device has not expired, the measurements continue to be compared to the reference vacuum. The last gauge pressure measurement may be used when the timed duration expires for the test. The algorithm 100 then proceeds to step 104.

At step 104, the controller 17 compares the value from step 102 to the reference vacuum, and determines if the measured value corresponds to a leak orifice size which exceeds a calibrated threshold, e.g., approximately 0.030" to approximately 0.040". Algorithm 100 proceeds to step 106 if the value corresponds to a leak orifice which exceeds the calibrated threshold, and otherwise proceeds to step 105.

At step 105, the controller determines if the leak orifice determined at step 104 exceeds a lower threshold indicating a threshold small leak, e.g., approximately 0.020" in one possible embodiment, or approximately 10 times the vacuum drawn in the presence of the threshold large leak in another embodiment. In another embodiment, the threshold small leak corresponds to an equivalent orifice diameter of approximately 50% to approximately 70% of an equivalent orifice diameter corresponding to the threshold large leak. The controller 17 sets a first diagnostic code if the leak orifice is greater than the calibrated minimum threshold. The detected small leak may still require service, but it remains smaller than the calibrated maximum threshold indicating an unsecured fuel cap 40. The algorithm is finished, as indicated by a double asterix (**) in FIG. 3, once the first diagnostic code is set.

At step 106, the controller 17 next detects completion of a prior refueling event of the vehicle 10 of FIG. 1 using various measurements. For instance, when refueling a vehicle equipped with the switch 61 shown in FIG. 2, an operator of the vehicle activates the switch, and therefore activation of the switch may be used as one of the measurements indicating the start of the refueling event. An operator opens the fuel door 45 covering the fuel cap 40, and then removes the fuel cap. The controller 17 can therefore process position signals from the fuel door position sensor 41 of FIG. 2 to determine whether the fuel door 45 has been opened or closed.

Once fuel 35 is added to the fuel tank 38, the controller 17 can determine whether a calibrated change in fuel level or a calibrated percent increase in fuel is present with respect to the amount of fuel 35 in the fuel tank. From this, the controller 17 records that a refueling event is detected. Algorithm 100 proceeds to step 108 if such a refueling event is detected, and is finished if such a refueling event is not detected. If a refueling event is not detected, the controller 17 sets the first diagnostic code in the same manner as step 105.

At step 108, with the controller 17 having detected at prior step 106 that a refueling event has been completed and that a leak exceeds the calibrated maximum threshold from step 104, the controller 17 sets a second diagnostic code indicating the potential presence of a threshold large leak in the sealed fuel system 14. That is, the controller 17 allows the second diagnostic code to be set only upon the detection of the completed refueling event, i.e., when there is a relatively high probability of the fuel cap 40 being less than adequately secured. The second diagnostic code may continue to be active until the cause of the detected leak is corrected, such as by tightening the fuel cap 40, at which point the second diagnostic code may be reset or otherwise erased. Algorithm 100 then proceeds to step 110.

At step 110, controller 17 executes a suitable control action indicating the presence of the second diagnostic code. For instance, a "check fuel cap" message may be transmitted to an operator of the vehicle 10 of FIG. 1 for display in the vehicle, and/or such a message may be transmitted to a remote location. The message may be text, or it may take the form of illumination of a simple indicator light, and/or activation of an audible alarm. Once the control action of step 110 has been executed, algorithm 100 repeats step 102 and the subsequent steps in a loop until the second diagnostic code has been cleared.

While the best modes for carrying out the invention have been described in detail, those familiar with the art to which this invention relates will recognize various alternative designs and embodiments for practicing the invention within the scope of the appended claims.

The invention claimed is:
1. A vehicle comprising:
 a sealed fuel system having a fuel tank, a fuel cap for sealing an inlet to the fuel tank, a control orifice, and an absolute pressure sensor calibrated to a diameter of the control orifice; and
 a controller which automatically associates a threshold large leak in the sealed fuel system with a sealing error of the fuel cap, wherein the controller is operable for:
  detecting completion of a prior refueling event of the vehicle;
  comparing vacuum measurements from the absolute pressure sensor to a reference vacuum across the control orifice to determine the presence of the threshold large leak;
  setting a diagnostic code corresponding to the threshold large leak only when the presence of the threshold large leak is determined in conjunction with the completion of the prior refueling event; and
  resetting the diagnostic code when the fuel cap is tightened.

2. The vehicle of claim 1, wherein the sealed fuel system further includes a vacuum pump operable for generating the reference vacuum across the control orifice and a switching valve for selectively connecting the fuel tank to the vacuum pump.

3. The vehicle of claim 1, wherein the vehicle includes a traction motor adapted for selectively generating electrical motor torque suitable for propelling the vehicle in an electric-only propulsion mode.

4. The vehicle of claim 1, further comprising a fuel door position sensor, wherein the controller detects the completion of the prior refueling event by processing at least one of position signals from the fuel door position sensor or a fuel level in the fuel tank.

5. The vehicle of claim 1, wherein the controller is further operable for comparing the vacuum measurements from the absolute pressure sensor to the reference vacuum to thereby determine the presence of a threshold small leak which has a corresponding leak size that is less than that of the threshold large leak, and for setting a diagnostic code indicating the presence of the threshold small leak.

6. The vehicle of claim 5, wherein the threshold small leak corresponds to an equivalent orifice diameter of approximately 50% to approximately 70% of an equivalent orifice diameter corresponding to the threshold large leak.

7. The vehicle of claim 1, wherein the controller is operable for generating a message informing an operator of the vehicle to tighten the fuel cap in response to the diagnostic code.

8. A method for detecting a threshold large leak in a sealed fuel system of a vehicle, wherein the sealed fuel system includes a fuel tank, a fuel cap for sealing an inlet to the fuel tank, a refuel request switch which signals for a relief of excess pressure or vacuum in the sealed fuel system prior to unlocking the fuel cap, a control orifice, and an absolute pressure sensor which is calibrated to a diameter of the control orifice, the method comprising:
  detecting a completion of a prior refueling event of the vehicle, including determining whether the refuel request switch has been activated;
  comparing vacuum measurements from the absolute pressure sensor to a reference vacuum across the control orifice to determine the presence of the threshold large leak; and
  setting a diagnostic code corresponding to the threshold large leak only when the completion of the prior refueling event is also detected, thereby automatically associating a threshold large leak of the sealed fuel system with a sealing error of the fuel cap.

9. The method of claim 8, further comprising automatically resetting the diagnostic code when the fuel cap is tightened.

10. The method of claim 8, wherein the vehicle includes a sensor adapted to measure a position of a fuel door covering the fuel cap, and wherein detecting completion of the prior refueling event includes processing position signals from the sensor.

11. The method of claim 8, wherein detecting a completion of the prior refueling event includes determining a change in a level of fuel in the fuel tank.

12. The method of claim 8, further comprising:
  comparing the vacuum measurements from the absolute pressure sensor to the reference vacuum to thereby determine the presence of a threshold small leak which has a corresponding orifice size that is less than that of the threshold large leak; and
  setting another diagnostic code indicating the presence of the threshold small leak.

13. The method of claim 8, further comprising generating a message informing an operator of the vehicle to tighten the fuel cap in response to the diagnostic code.

14. An apparatus comprising:
  a sealed fuel system having:
    a fuel tank;
    a fuel cap for sealing an inlet to the fuel tank;
    a refuel request switch which signals for a relief of excess pressure or vacuum in the sealed fuel system prior to unlocking the fuel cap;
    a control orifice, and an absolute pressure sensor calibrated to a diameter of the control orifice; and
    a controller in communication with the sealed fuel system, and which automatically associates a threshold large leak in the sealed fuel system with a sealing error of the fuel cap, wherein the controller is configured to:
      detect completion of a prior refueling event of the vehicle, including determining whether the refuel request switch has been activated;
      compare vacuum measurements from the absolute pressure sensor to a reference vacuum across the control orifice to determine the presence of the threshold large leak; and
      set a diagnostic code corresponding to the threshold large leak only when the presence of the threshold large leak is determined in conjunction with the completion of the prior refueling event.

15. The system of claim 14, wherein detecting a completion of the prior refueling event also includes determining a change in a level of fuel in the fuel tank.

* * * * *